US012767456B2

(12) United States Patent
Ruge

(10) Patent No.: US 12,767,456 B2
(45) Date of Patent: Oct. 20, 2026

(54) TAKE-OVER APPLIANCE FOR A SORTING FACILITY AND A SORTING FACILITY

(71) Applicant: Ferag AG, Hinwil (CH)

(72) Inventor: Martin Ruge, Hinwil (CH)

(73) Assignee: FERAG AG, Hinwil (CH)

( * ) Notice: Subject to any disclaimer, the term of this patent is extended or adjusted under 35 U.S.C. 154(b) by 153 days.

(21) Appl. No.: 18/665,641

(22) Filed: May 16, 2024

(65) Prior Publication Data

US 2024/0391703 A1 Nov. 28, 2024

(30) Foreign Application Priority Data

May 25, 2023 (CH) .......................... CH000555/2023

(51) Int. Cl.
*B65G 47/44* (2006.01)
*B65G 11/10* (2006.01)
*B65G 11/20* (2006.01)

(52) U.S. Cl.
CPC ............ *B65G 47/44* (2013.01); *B65G 11/103* (2013.01); *B65G 11/203* (2013.01)

(58) Field of Classification Search
CPC .... B65G 11/103; B65G 11/203; B65G 47/44; B65G 47/519; B07C 3/008
See application file for complete search history.

(56) References Cited

U.S. PATENT DOCUMENTS

| | | | | |
|---|---|---|---|---|
| 5,176,299 | A * | 1/1993 | Krooss | B65G 47/1407 414/745.9 |
| 9,963,300 | B2 * | 5/2018 | Mäder | B65G 35/00 |
| 11,001,454 | B2 * | 5/2021 | Becher | B65G 47/5104 |
| 11,485,587 | B2 * | 11/2022 | Becher | B65G 47/57 |

FOREIGN PATENT DOCUMENTS

| | | | | |
|---|---|---|---|---|
| CN | 203921796 U | 11/2014 | | |
| CN | 111153171 A | 5/2020 | | |
| DE | 299 01 222 U1 | 5/1999 | | |
| EP | 3 144 254 A1 | 3/2017 | | |
| JP | 2557247 B2 | 11/1996 | | |
| JP | 2001-220006 A | 8/2001 | | |
| WO | WO-2024194238 A1 * | 9/2024 | | B65G 47/5109 |

OTHER PUBLICATIONS

Switzerland Search Report dated Aug. 23, 2024, Application No. CH00555/23; 1 page.
Extended European Search Report dated Oct. 30, 2024, Application No. 24175883.8; 9 pages.

* cited by examiner

*Primary Examiner* — Gene O Crawford
*Assistant Examiner* — Keith R Campbell
(74) *Attorney, Agent, or Firm* — Rankin, Hill & Clark LLP

(57) ABSTRACT

A take-over appliance for a sorting facility for taking over piece goods which at a delivery location are delivered from a sorting conveyor, including a buffer device which forms a storage space, for the intermediate storing or buffering of delivered piece goods, wherein the storage space of the buffer device can be changed during the operation of the sorting facility. The buffer device includes a flexible, two-dimensional rest element which for the intermediate storing of piece goods forms a receiving trough for the piece goods, the receiving trough delimiting the storage space. The buffer device further includes an adjusting mechanism for adjusting the trough depth for the purpose of changing the storage space.

20 Claims, 9 Drawing Sheets

TAKE-OVER APPLIANCE FOR A SORTING FACILITY AND A SORTING FACILITY

BACKGROUND OF THE INVENTION

Field of the Invention

The invention lies in the field of conveying and sorting technology and relates to a take-over appliance for a sorting facility as well as to a sorting facility for sorting piece goods which at delivery locations are delivered from a sorting conveyor along a delivery stretch.

Description of Related Art

In sorting facilities, piece goods are conveyed along a delivery stretch towards delivery locations by way of a sorting conveyor and are delivered at the delivery locations according to defined criteria, such as e.g. product type, receiver address, shape, size, weight, etc. For this, the piece goods at the respective delivery locations are delivered from the sorting conveyor to take-over appliances in a targeted manner by way of a control device. The piece goods are herein each moved from the delivery location into a take-over region. The take-over appliance can e.g. include a collecting appliance which forms the take-over region and which is with a collecting table or collecting container, in which the delivered piece goods are collected.

The conveying or the movement of the piece goods between the delivery location and the take-over region is usually effected in an unguided and passive manner. Passive conveying means that the piece goods are conveyed solely by way of their kinetic energy which is obtained from the sorting conveyor and/or by way of gravitational assistance. I.e. no actively driven conveying elements which convey the piece goods are provided. Thus, for example, it is known to convey piece goods from the delivery location to the take-over region via slides.

The situation of comparatively many piece goods being delivered at a delivery location within a certain time period can occur, such exceeding the receiving capacity or the further processing capacity in the take-over region. On the other hand, the situation of comparatively few piece goods being delivered at a delivery location over a certain time period can also occur, such lying below the receiving capacity or the further processing capacity in the take-over region.

SUMMARY OF THE INVENTION

It is an object of the present invention to put forward a buffer device for the intermediate storage or buffering of piece goods which are delivered at delivery locations, in the case that the number of piece goods which are delivered in a time period exceeds the receiving capacity or the further processing capacity in the take-over region. The buffer device, also called storage device or intermediate storage device should be constructed in a simple manner as well as be low in maintenance and permit a rapid filling and emptying again of the buffer store. Furthermore, the buffer device should make do without additional active conveying means for the (continued) conveying of the piece goods.

In accordance with the claims, the invention relates to a take-over appliance for a sorting facility for taking over piece goods which at a delivery location are delivered from a sorting conveyor. The take-over appliance include a buffer device which forms a storage space or a storage volume, for the intermediate storage or buffering of delivered piece goods, wherein the size of the storage space of the buffer device can be adjusted or changed during the running operation of the sorting facility.

The buffer device in particular is designed as a pass-through store, concerning which the piece goods are fed to the storage space via an entry and are led away out of the storage space via an exit which in the process direction is arranged subsequent to the entry.

According to the invention, the buffer device includes a flexible, two-dimensional rest element which for the intermediate storing or buffering of piece goods forms a receiving trough for the piece goods, said receiving trough delimiting the storage space.

The buffer device includes an adjusting mechanism for adjusting the depth of the receiving trough, the so-called trough depth, for the purpose of changing the storage space.

By way of the adjusting mechanism, one can adjust the rest element, in particular between a storage position, in which the rest element forms a receiving trough with an adjustable storage space for the intermediate storage or buffering of at least one piece good, and an empty position, in which the rest element forms no storage space for the intermediate storage or buffering of piece goods. In the empty position, the rest element between a trough entry and a trough exit in particular forms a plane rest surface or a sliding or slipping surface for the piece goods.

The flexible, two-dimensional rest element in particular forms the base of the storage space.

Flexible means that the rest element is supple or pliable, in particular without plastic deformation. The pliability can also be effected by way of joints. The piece good rest can for example sag due to the effect of gravity.

Two-dimensional means that the surface extension (width and length) of the rest element is a multiple larger than its height extension (thickness).

The receiving trough in particular is delimited by a trough entry which in the process direction is arranged in front of the receiving trough and by a trough exit which in the process direction is arranged after the receiving trough. This means that the trough exit is different from the trough entry.

The piece goods are conveyed or moved into the receiving trough in the process direction in particular via the trough entry.

The piece goods are conveyed or moved out of the receiving trough in the process direction in particular via the trough exit.

This means that the receiving trough is formed between a trough entry and a trough exit. The rest element at the trough entry or trough exit is deflected in particular downwards towards the storage space.

At the trough entry and at the trough exit, the rest element is guided in particular via a stationary structure, such as for example deflecting elements, or is fastened to this structure.

Accordingly, the piece goods are moved in the process direction into the receiving trough via the trough entry and are moved out of the receiving trough again via the trough exit.

The rest element is arranged in particular in a sagging manner, in particular in a freely sagging manner, in the region of the receiving trough or between the trough entry and the trough exit.

In particular, the receiving trough is characterised by a concave curvature of the rest element. The receiving trough in particular is formed by a loop-like course of the rest element. In particular, the receiving trough represents a hanging loop.

According to a special embodiment, the trough exit lies lower than the trough entry with respect to the direction of gravity. By way of this, it is ensured that given a size reduction of the storage space or of the receiving trough, the piece goods leave the receiving trough via the trough exit which is situated more deeply.

According to a first embodiment variant, the adjusting mechanism is designed in order to change the length of the rest element between the trough entry and the trough exit of the receiving trough. The change of the mentioned length effects an adjustment of the trough depth and thus of the storage space. The trough depth and thus the storage space therefore become smaller given a shortening of the length and larger given an increase of the length.

Depending on the occurring quantity of piece goods at a delivery location, the quantity exceeding the take-over capacity or further processing capacity in the take-over region, the length of the rest element between the trough entry and the trough exit is increased to the extent that an adequate trough depth and thus an adequate storage space for buffering the excess piece goods which cannot be fed directly to the take-over region is available.

For emptying the intermediate store or the buffer or for the further transport of individual or groups of piece goods into the take-over region, the trough depth and thus the storage space is reduced in size by way of shortening the length of the rest element between the trough entry and the trough exit. By way of reducing the size of the trough depth and thus of the receiving trough, the piece goods are lifted in the receiving trough. Concerning this procedure, the uppermost piece goods in the buffer store are let out of the receiving trough in the process direction and are moved in the direction of the take-over region.

For adjusting or changing the length of the rest element between the trough entry and the trough exit of the receiving trough, the adjusting mechanism in particular includes a storage configuration for storing a length section of the rest element. For this, in particular the storage configuration includes at least one storage means for the (intermediate) storage of a length section of the rest element.

In particular, the storage means is arranged outside the receiving trough.

One can envisage the storage means being integrated into the deflecting element at the trough entry or trough exit or forming this. Thus, for example, the deflection element at the trough entry or trough exit can be formed by the winding-up and unwinding body.

If for example the length of the rest element between the trough entry and the trough exit of the receiving trough is to be reduced for the purpose of size reduction of the storage space, then the shortened length section in particular is stored in the storage means outside the receiving trough.

If on the other hand the length of the rest element between the trough entry and the trough exit of the receiving trough is to be enlarged for the purpose of enlarging the storage space, then the necessary length is released from the storage means.

The size of the storage space of the receiving trough can constantly change during the operation of the sorting facility. This means that the size of the storage space is adapted to the current quantity of piece goods which is to be buffered, in particular in a continuous, i.e. dynamic manner. The storage configuration or its storage means is therefore designed as a dynamic store.

For this, the take-over appliance can include sensor means for the time-dependent detection of the piece goods which are delivered at a delivery location. The sensor means can include e.g. a light barrier which is arranged at the delivery location and which continuously detects the delivered piece goods.

Alternatively or additionally, sensor means can also be present in the embodiment of a force measuring arrangement which continuously measures a tensile force which is exerted by the rest element. The complete weight of the piece goods which are intermediately stored in the receiving trough can be determined from the measured tensile force. The measured tensile force is therefore a measure for the quantity of piece goods which are intermediately stored in the receiving trough.

The size of the storage space is then set by way of the control device in dependence on the piece goods which are detected by the sensor means as well as on the processing capacity in the take-over region.

The control device in particular is the facility control for the control of the sorting facility.

Since the delivery of piece goods at predefined delivery locations is effected in a sorting facility in a controlled manner by way of the control device, the information (delivery information) on the delivery point in time as well as on the delivery location of the piece goods which are to be delivered or are delivered is already stored in the control device.

Accordingly, instead of with the aid of sensor means, the size of the storage space can also be set on the basis of the delivery information on the piece goods which are to be delivered or are delivered, said information being stored in the control device.

According to an embodiment, for the purpose of enlarging or reducing the trough depth, the storage configuration includes at least one winding-up and unwinding body for winding up and unwinding a length section of the rest element.

This means that the storage means here is a winding-up and unwinding body.

Concerning this embodiment, in particular an end section of the rest element is connected to the at least one winding-up and unwinding body or fastened to this. The winding-up and unwinding body in particular is driven by a drive.

According to an embodiment, the rest element is fastened with an end section which in the process direction is arranged in front of the receiving trough, in particular in front of the trough entry, to the winding-up and unwinding body.

According to a further embodiment, the rest element is fastened with an end section which in the process direction is arranged after the receiving trough, in particular after the trough exit, to the winding-up and unwinding body.

According to a further embodiment, the storage configuration includes a first winding-up and unwinding body, at which a first end section of the rest element is fastened, the first end section in the process direction being arranged in front of the receiving trough, in particular in front of the trough entry, and a second winding-up and unwinding body, at which a second end section of the rest element is fastened, the second end section in the process direction being arranged after the receiving trough, in particular after the trough exit.

The change of the length of the rest element between the trough entry and the trough exit can now be effected simultaneously by both or selectively by one of the two winding-up and unwinding bodies.

The winding-up and unwinding body can be e.g. a roller, a coiler or a reel.

The storage means can also be a loop store.

With regard to a loop store, a length section of the rest element is led around several deflection elements, such as deflection rollers, in a loop-like manner. By way of changing the position of the deflection elements relative to one another, the length of the length section which is led around the deflection elements, i.e. the size of the loop of the rest element can be changed.

The storage means can consist of one or more dancer rollers.

Concerning this embodiment, a length section of the rest element is led around at least one dancer roller which is designed as a deflection roller and which is arranged on a spring-loaded dancer arm. By way of changing the position of the dancer arm, in a manner comparable with a loop store, the length of the length section of the rest element which is led around the dancer roller can be changed.

For shortening the length of the rest element between a trough entry and a trough exit for the purpose of reducing the trough depth, the adjusting mechanism in particular is designed to exert a tensile force upon the rest element, in particular upon an end section of the rest element.

If the storage means is a winding-up and unwinding body, then the tensile force upon the rest element is generated by the winding-up procedure.

The rest element at the trough entry or at the trough exit or at the trough entry as well as the trough exit in particular is led around a deflecting element, such as deflection roller. The adjusting device or the associated storage means is then in particular designed or arranged such that a length section of the rest element is moved over at least one of the deflecting elements on changing the length of the rest element between the trough entry and the trough exit.

The rest element can also be fastened with an end section either to the trough entry or to the trough exit via a holding device.

The rest element in particular in a further development of the first variant of the invention can form a rest section with a rest surface for the piece goods which are released from the receiving trough, the rest section being subsequent to the trough exit in the process direction. In particular, the rest surface is designed in a plane manner. In particular, the rest surface is arranged horizontally. The rest surface can also form a gradient in the process direction, i.e. be inclined to the bottom.

The rest element here is deflected at the trough exit out of the receiving trough into the rest section in particular about a deflecting element.

The adjusting mechanism with the storage configuration is then designed such that the length of the rest element between the trough entry and the trough exit can be shortened by way of the rest section of the rest element being pulled forwards via the adjusting mechanism, i.e. being moved in the process direction.

This is effected for example by way of the storage means of the storage configuration being arranged subsequently to the rest section in the process direction and a tensile force being exerted upon the rest section of the rest element by way of the adjusting mechanism.

By way of pulling forward the rest section and the size reduction of the storage space which is entailed by this, individual piece goods are moved out of the receiving trough via the trough exit and are moved on the rest section which is co-moved by the pulling-forward, in the process direction, in particular in the direction of the take-over region.

The pulling-forward of the rest section for the purpose of size reduction of the storage space simultaneously effects a conveying-active movement of the piece goods which lie on the rest section.

A support element for supporting the flexible, two-dimensional rest section of the rest element to the bottom can be arranged below the rest section of the rest element.

According to an alternative embodiment, the rest element is designed in a continuous manner. Accordingly, the rest element is led around deflecting elements such as deflection rollers. According to this embodiment, the storage means in particular is formed by a loop store or by way of dancer rollers or a combination of both. Furthermore, a drive for exerting a tensile force upon the rest element can be provided for the purpose of shortening the length of the rest element between the trough entry and the trough exit. In the context of the enlargement of the length of the rest element between the trough entry and the trough exit, the drive can also apply a braking function.

The aforedescribed rest section of the rest element subsequent to the trough entry as well as the associated conveying function can also be realised in the context of a continuously guided rest element.

According to a second embodiment variant, the adjusting mechanism includes a lifting configuration with a lifting element, by way of which the rest element can be lifted or lowered in the region of the receiving trough for the purpose of changing the storage space or the trough depth. For this, the lifting configuration in particular includes a mechanism for lifting and lowering the lifting element.

The lifting configuration or the mentioned mechanism can include e.g. a hydraulic, pneumatic or electromotoric drive, e.g. with a pneumatic or hydraulic cylinder. The lifting element can form an in particular plane contact surface towards the rest element. The lifting element can be designed e.g. such that the rest element forms a plane surface in an empty position of the lifting element, in which no storage space is formed. The plane surface can be horizontal. The plane surface can be inclined to the bottom or downwards in the process direction. The plane surface can be a sliding or slipping surface. For this, the lifting element can be designed e.g. as a plate element.

It is also conceivable for the lifting element to form a convex contact surface towards the rest element, so that the rest element is bent or shaped convexly upwards in the empty position of the lifting element. By way of this, a reliable emptying of the storage space is ensured by way of the piece goods which are lifted out of the receiving trough sliding away from the convex surface of the rest element in the direction of the take-over region in the empty position.

Given an interaction with the lifting element, the rest element can also serve as a brake for the piece goods which slide away from the conveying tray, by way of the piece goods running onto the convex curved rest element. For this, the convex curved contact surface of the lifting element can be designed in a compliant manner, so that this even damps the impact of the piece goods which run on.

The flexible, two-dimensional rest element can be tape-shaped or tape-like. The rest element can be a tape, a foil, a mat, a belt or a net.

The flexible, two-dimensional rest element can be a textile sheet formation such as a fabric. The rest element can be designed e.g. as a cloth.

The flexible, two-dimensional rest element can also be of elements which are linked to one another and be present e.g. as a mat chain.

The flexible, two-dimensional rest element can consist of plastic. The rest element can include an elastomer or consist of this. The rest element can consist of a fibre-reinforced plastic. The rest element can also consist of a wire braid.

The rest element very generally and in the context of the second variant of the invention can be designed elastically in a manner such that the rest element elastically stretches amid the enlargement of the storage space or trough depth due to the weight force of the piece goods which are intermediately stored in the receiving trough.

Accordingly, the elastic rest element according to this further development elastically shortens amid the size reduction of the storage space or trough depth due to the relieving of the weight load on lifting by way of the lifting element.

The buffer device in particular includes retaining elements which are arranged laterally of the rest element for laterally holding back the piece goods in the receiving trough.

The receiving trough together with the lateral retaining elements forms the storage space for the piece goods.

The take-over appliance can includes a feed device which is arranged in front of the buffer device in the process direction and is with a conveying slide, via which the piece goods at the delivery location are fed to the buffer device by way of gravity.

In particular, the piece goods at the delivery location are fed to the buffer device from a sorting conveyor, in particular from the conveying trays of a sorting conveyor.

However, one can also envisage the buffer device or its rest element or the receiving trough which is formed from this element, at the delivery location being directly laterally subsequent or adjacent to the sorting conveyor or its conveying trays, so that the piece goods which are delivered at the delivery location from the sorting conveyor, in particular from conveying trays of the sorting conveyor slide or fall directly onto the rest element or into the receiving trough of the buffer device by way of gravitational assistance. Usually, the piece goods therefore obtain sufficient kinetic energy, in order by way of gravitational assistance to slide from the sorting conveyor, in particular from the laterally tilted conveying trays and fall directly into the receiving trough of the buffer device.

In this embodiment, the buffer device in particular includes retaining elements which are arranged laterally of the rest element, for laterally holding back the piece goods which are delivered into the receiving trough in an unguided manner.

The take-over region can be for example a collecting region, in which the piece goods are collected for the further processing. The collecting region includes a collecting device such as e.g. a collecting table or a collecting container. For further processing, the piece goods can be taken from the collecting table, e.g. by hand by way of operating personnel.

The take-over region can also be formed by a take-over conveyor which takes over the delivered goods for the further conveying. The piece goods can be transferred to the take-over conveyor by hand by way of operating personal or in an automated manner.

The take-over region can also very generally be a processing device, in which the delivered piece goods are processed further.

The invention moreover relates to a sorting facility with a sorting conveyor and with at least one delivery location, as well as with a take-over appliance according to the invention which is arranged at the at least one delivery location, as is described above. The at least one delivery location in particular is arranged laterally of the sorting conveyor or laterally of the conveying track of the sorting conveyor.

The sorting facility includes in particular a plurality of delivery locations which are arranged along the delivery track of the sorting conveyor and at which in each case a take-over appliance according to the invention and according to the above description is each arranged. The delivery locations in particular are arranged at both sides of the sorting conveyor or of its conveying track. The delivery locations are arranged in particular in a delivery zone.

The sorting conveyor can include e.g. a plurality of conveying means which each convey one or more piece goods. The sorting conveyor can be e.g. a tilt-tray conveyor. The conveying means here are tilt-trays which for the delivery of the products at the respective delivery locations are tilted or pivoted laterally considered in the conveying direction.

The conveyor can also be a gripper conveyor, concerning which the piece goods are released from the gripper at the at least one delivery location. The conveyor can also be a pocket conveyor concerning which the piece goods are delivered at the at least one delivery location by way of tilting the conveying pockets.

The conveyor can further also be a belt conveyor such as a modular belt conveyor, with diverter stations for diverting out the piece goods at the respective delivery locations. The conveyor can also be a transverse belt conveyor.

The invention also relates to a method for taking over piece goods by way of a take-over appliance as described above, the piece goods being delivered at a delivery location of a sorting facility by way of a sorting conveyor.

The method includes the following steps:

delivering a piece good at the delivery location;

taking over the delivered piece good by the take-over appliance.

The method according to the invention is characterised in that the piece good moves into the receiving trough of the buffer device and is intermediately stored in the receiving trough.

For the intermediate storage of several piece goods, the depth of the receiving trough and by way of this the storage space is adapted by the adjusting mechanism in the aforementioned manner.

For the further conveying of the piece good or a piece good, the depth of the receiving trough and by way of this the storage space is reduced in size by the adjusting mechanism in the manner described above, wherein by way of this the piece good is moved out of the receiving trough in the process direction.

According to a further development of the method, the rest section of the rest element is pulled forward, by which means the depth of the receiving trough is reduced in size amid the reduction in size of the storage space and the piece good is consequently moved out of the receiving trough via the trough exit and on the pulled forward rest section in the process direction, in particular into a take-over region.

The adjusting mechanism in particular is controlled by a control device. The control of the adjusting mechanism in particular is effected in dependence on the quantity or number of piece goods which is delivered at the respective delivery location in a time period.

The take-over appliance according to the invention can be applied on sorting dispatches, such as parcels in a distribution centre, e.g. a postal distribution centre.

The take-over appliance according to the invention can be applied on order-picking customer orders in a logistics centre.

The take-over appliance according to the invention can be applied e.g. also given a processing of product returns from sales locations. Such product returns take place for example in the event of recall actions, customer returns, on stock reduction or given a change of the product range. As a rule, the piece goods, i.e. the products are returned from the sales locations in an unsorted manner. The products are then assorted again by type and according to certain common features by way of the sorting facility.

The piece goods, also called conveying goods can be e.g. parcels.

The piece goods can be products from the consumer product sector, such as e.g. cosmetic articles, body care articles, medicines, foods, clothes, household articles, etc.

The piece goods or products can be present as bottles, cans, tubes, bags, cartons, boxes, etc. The products can be packaged in sales packages.

Thanks to the buffer device according to the invention, the piece goods which are delivered by the sorting conveyor can be buffered, i.e. intermediately stored, before reaching the take-over region. By way of this, one can prevent too many piece goods which exceed the processing capacity in the take-over region from being transported into the take-over region.

On account of the dynamic adaptation of the storage space of the buffer device during the operation of the sorting facility, on the one hand one can adapt the storage space to the quantity of delivered piece goods. On the other hand individual ones or groups of piece goods can move out of the storage space in the direction of the take-over region by way of the dynamic reduction in the size of the storage space. This being the case without an additional conveying device becoming absolutely necessary.

BRIEF DESCRIPTION OF THE DRAWINGS

The subject-matter of the invention is hereinafter explained by way of embodiment examples which are represented in the accompanying figures. Shown in each case schematically are.

DETAILED DESCRIPTION OF THE INVENTION

Figure 1:
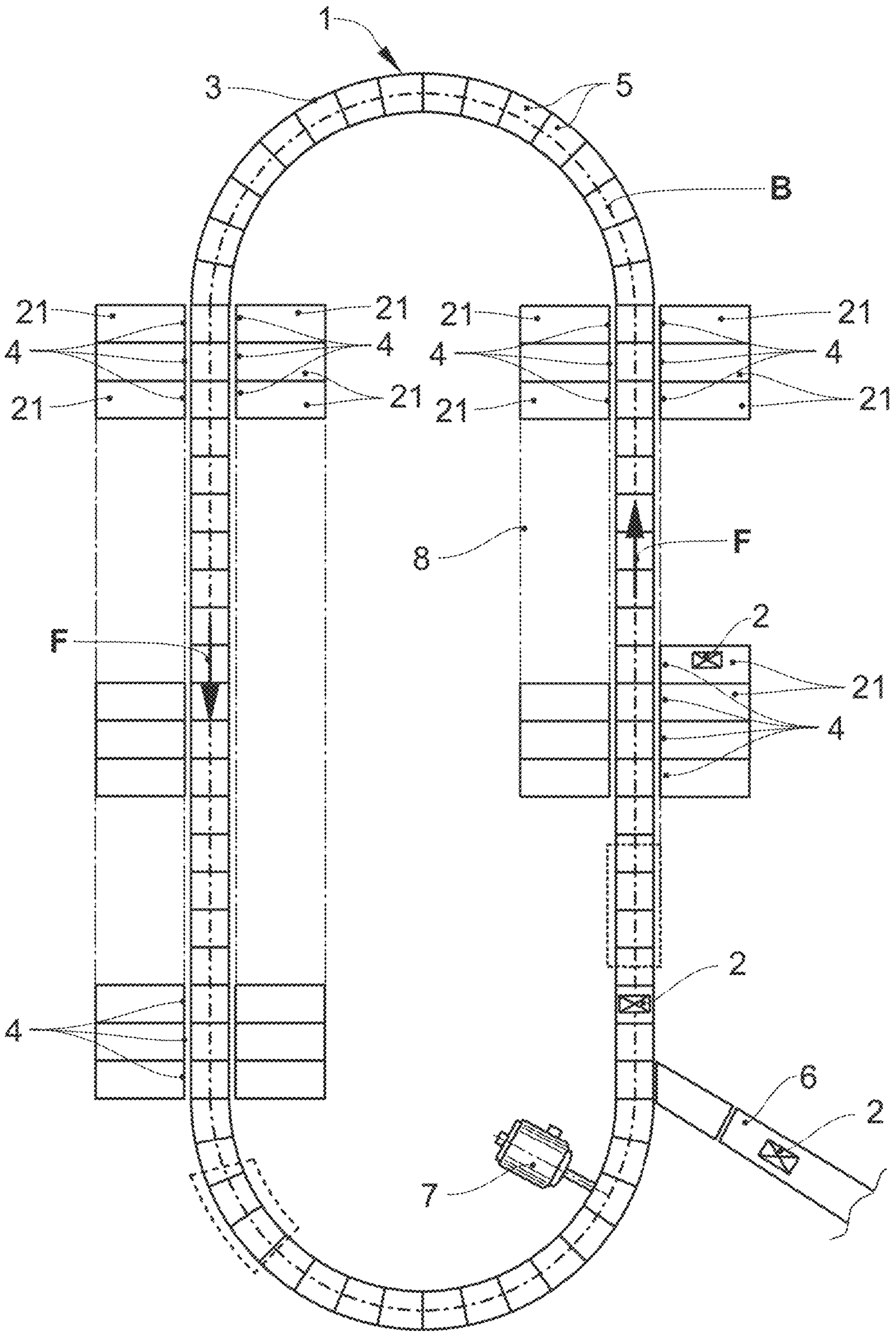
FIG. 1 a plan view of a sorting facility.

The sorting facility 1 according to FIG. 1 includes a sorting conveyor 3 which is driven via a drive 7, the sorting conveyor being in the embodiment of a tilt-tray conveyor 3 with a plurality of tilt trays 5 which can be moved along a conveying track B. The tilt trays 5 which are linked to one another are driven by a conveying chain which is led in a conveying channel.

A feed conveyor 6 conveys the piece goods 2 which are to be sorted, to the tilt tray conveyor 3 and transfers the piece goods 2 into the tilt trays 5 of the tilt tray conveyor 3. The tilt trays 5 with the piece goods 2 which are conveyed therein are moved in the conveying direction F through a delivery zone 8 along delivery locations 4 which are arranged laterally at both sides.

The piece goods 2, as is shown in FIGS. 2 to 8, are delivered at the envisaged delivery location 4 by way of lateral tilting of the tilt trays 5 of the tilt tray conveyor 3 and are transferred to a take-over appliance 21. For this, the piece good 2 with the assistance of gravity slides away from the laterally tilted conveying tray 5 over a pivoted-down side wall 9 of the conveying tray 5 in the direction of the take-over appliance 21.

Of course, instead of a tilt tray conveyor 3 one can also provide a different conveyor such as e.g. a gripper conveyor, a pocket conveyor, a transverse belt conveyor or a belt conveyor (not shown).

According to the embodiments according to FIGS. 2 to 4 and 6 to 8, the piece goods 2 after leaving the tilt tray 5 slide away in the process direction P over a conveying slide 36 of a feed conveying device 35 towards a buffer device 22 of the take-over appliance 21 with the assistance of gravity. The buffer device 22 connects directly to the conveying slide 36.

Figure 5:
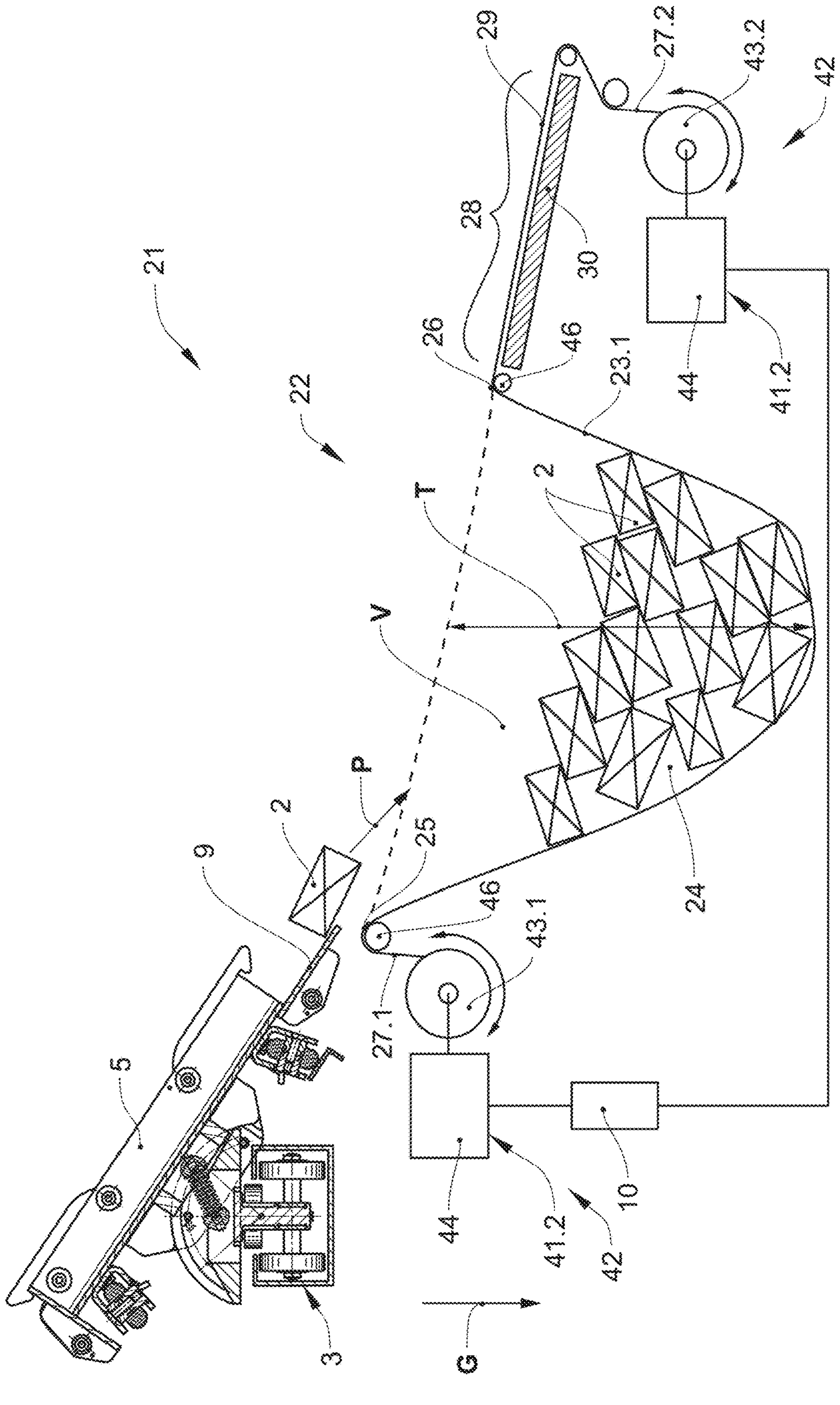
FIG. 5 a lateral view of a further embodiment of a take-over appliance.

According to the embodiment according to FIG. 5, the piece goods 2 assisted by gravity slide away from the conveying tray 5 over the downwardly pivoted side wall 9 towards the buffer device 22 of the take-over appliance 21 in a direct manner in the process direction P.

The process direction P represents the movement of the piece goods 2 through the take-over appliance 21.

The buffer device 22 includes a two-dimensional, flexible rest element 23.1, 23.2 e.g. in the form of a belt. The rest element 23.1, 23.2 is designed for shaping out a receiving trough 24, wherein the receiving trough 24 forms a storage space V for the intermediate storage of delivered piece goods 2. The receiving trough 24 is formed in a section between a trough entry 25 and a trough exit 26, in which section the rest element 23.1, 23.2 is freely suspended. The storage space V which is formed by the receiving trough 34 is laterally delimited by retaining elements 31 (see FIG. 2*b*). The lateral retaining elements 31 can be e.g. side walls.

The buffer device 22 moreover includes an adjusting mechanism, 41.1-41.3 by way of which the rest element 23.1, 23.2 can be adjusted between a storage position, in which the rest element 23.1, 23.2 forms a receiving trough 24 with an adjustable storage space V for the intermediate storage of at least one piece good 2 and an empty position, in which the rest element 23.1, 23.2 forms no storage space V for the intermediate storage of piece goods 2. In particular, the depth T of the receiving trough 24 and thus the size of the storage space V can be set via the adjusting mechanism 41.1-41.3.

The adjusting of the size of the storage space V, which also includes the assumption of the empty position, is effected dynamically via a control device 10 in dependence on the number of delivered piece goods 2 in a time period and on the further processing capacity in the take-over region. If for example the number of delivered piece goods 2 exceeds the further processing capacity in the take-over region in a time period, then the excess piece goods 2 are intermediately stored or buffered in the buffer device 22. As soon as the further processing capacity in the take-over region is greater than the number of piece goods 2 which is delivered in the same time period, then the piece goods 2 are released out of the buffer device 22 by way of reducing the size of the storage space V and are conveyed into the take-over region.

The piece goods 2 are therefore conveyed further or moved further in the process direction P from the conveying trays 5 either via an intermediate storing in the buffer device 22 or directly without an intermediate storing, into the take-over region of the take-over appliance 21. The take-over region can be e.g. a collecting region with a collecting device 37, in which the delivered piece goods 2 are collected for further processing. In the embodiments according to FIGS. 2 to 3 and 8, the collecting device is designed as an obliquely set collecting table 37. In the embodiments according to FIGS. 6 and 7, the collecting device is a collecting container 37.

The piece goods 2 can be removed from the collecting device 37 and fed to the further processing by operating personal by hand. Alternatively, the piece goods 2 can also be fed from the take-over region of a further processing in an automated process.

Figure 2A:
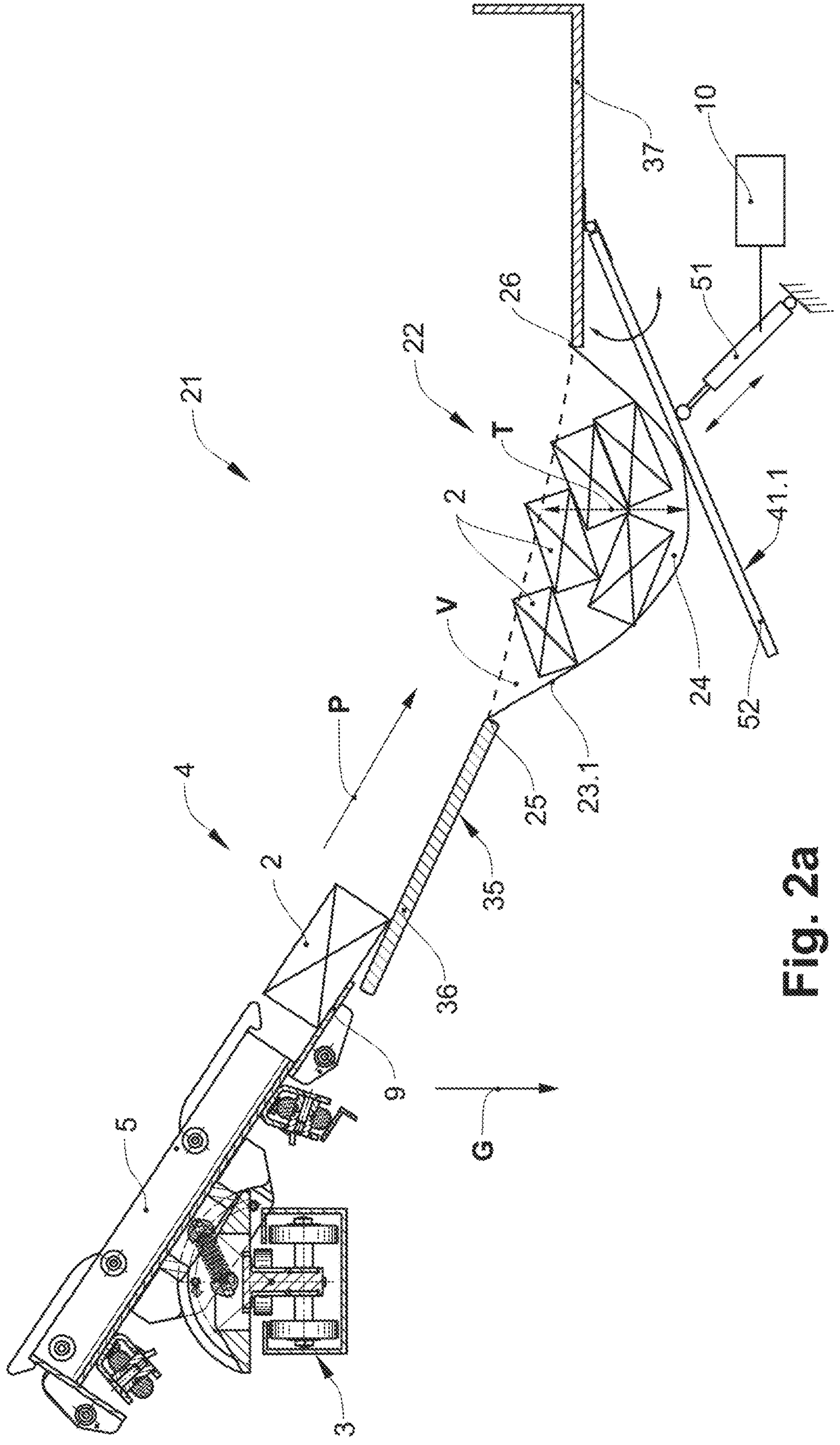
FIG. 2*a*, 2*b* lateral views of a first embodiment of a take-over appliance.
Figure 2B:
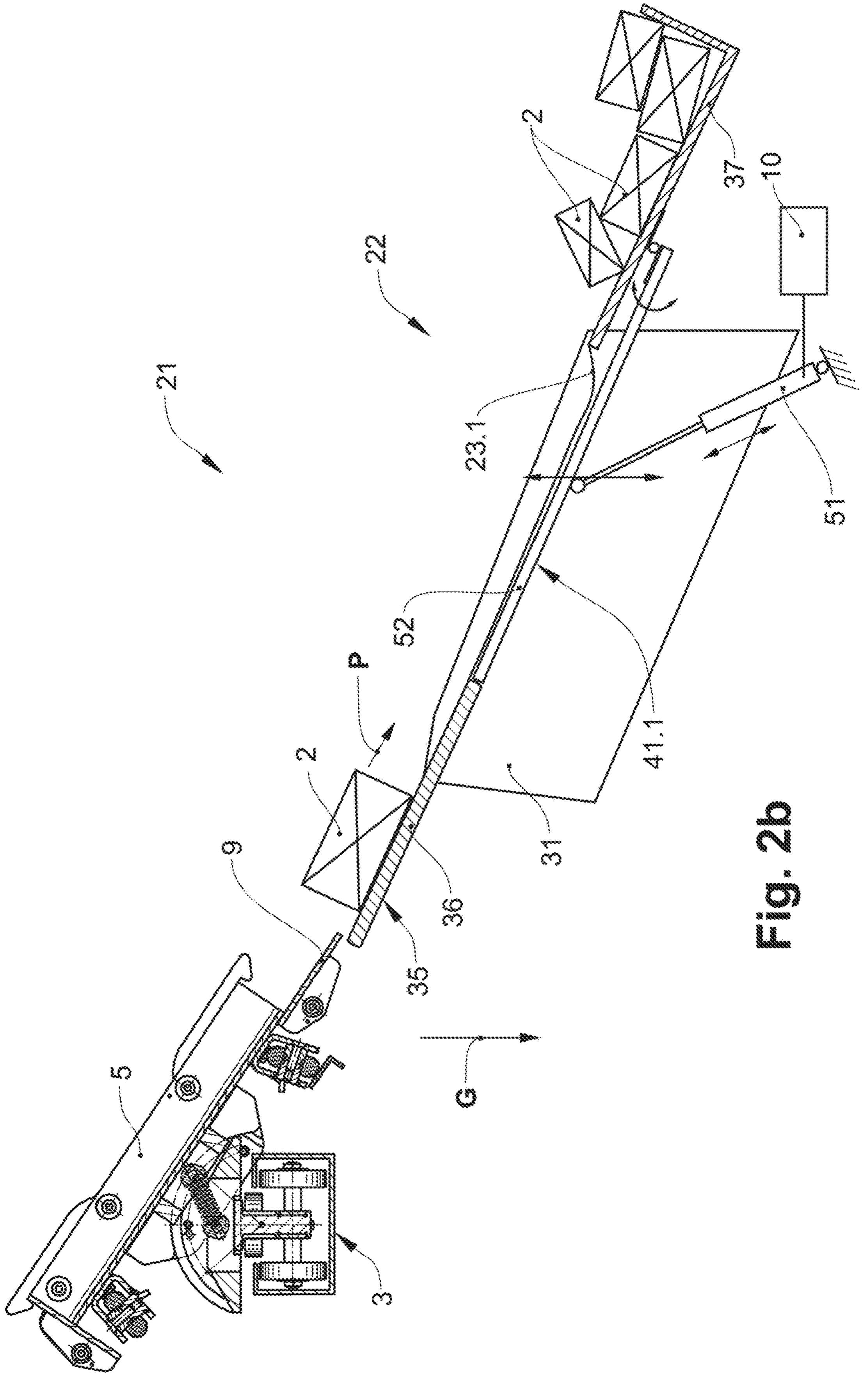
Figure 3:
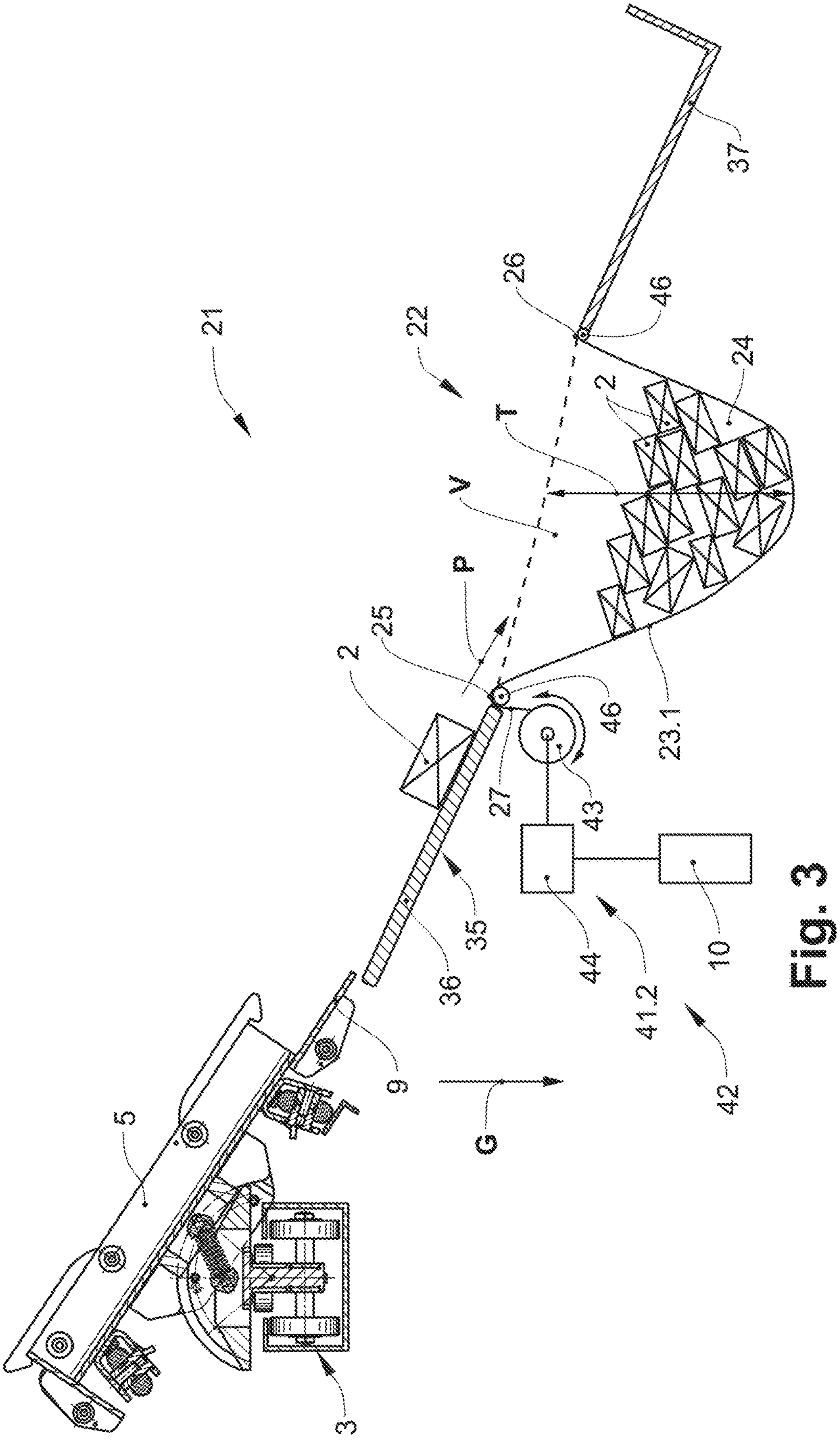
FIG. 3 a lateral view of a further embodiment of a take-over appliance.

According to the embodiment according to FIGS. 2*a* and 2*b*, the adjusting mechanism 41.1 includes a lifting configuration with a lifting element 52 and with a mechanism 51 for lifting and lowering the lifting element 52. The mechanism 51 for lifting and lowering the lifting element 52 is designed as a pneumatic cylinder whose piston on extending lifts the lifting element 52 and on retracting lowers the lifting element 52. The pneumatic cylinder is controlled via the control device 10.

The lifting element 52 is designed as a lifting plate which is arranged below the rest element 23.1. By way of lifting the lifting element 52, the rest element 23.2 is also lifted, in an extensive manner, wherein the depth T of the receiving trough 24 and thus the storage space V is reduced in size.

In an empty position of the lifting element 52, the rest element 23.1 lies on the plate-like lifting element 52 over a large surface and forms a plane sliding surface for the piece goods 2, the sliding surface being downwardly inclined in the process direction P. The rest element 23.1 in the empty position of the lifting element 52 therefore forms no receiving trough 24 and accordingly no storage space V for the lifted piece goods 2. The piece goods 2 which slide away from the conveying tray 5 in contrast slide directly over the sliding surface which is formed by the rest element 23.1, to the collecting table 37 in the collecting region.

The rest element 23.1 is designed in an elastic manner. For forming a storage space V for the purpose of intermediately storing piece goods 2, the lifting element 52 is lowered, by which means the rest element 23.1 extends elastically downwards amid the formation of a receiving trough 24 due to the load of the piece goods 2 which are conveyed onto this element. The lifting element 52 is lifted for releasing the piece goods 2 out of the storage space V, wherein the elastic rest element 23.1 contracts amid the size reduction of the storage space V. By way of this, the uppermost piece goods 2 are expelled from the storage space V and are conveyed to the collecting device 37 in the process direction P.

Figure 8:
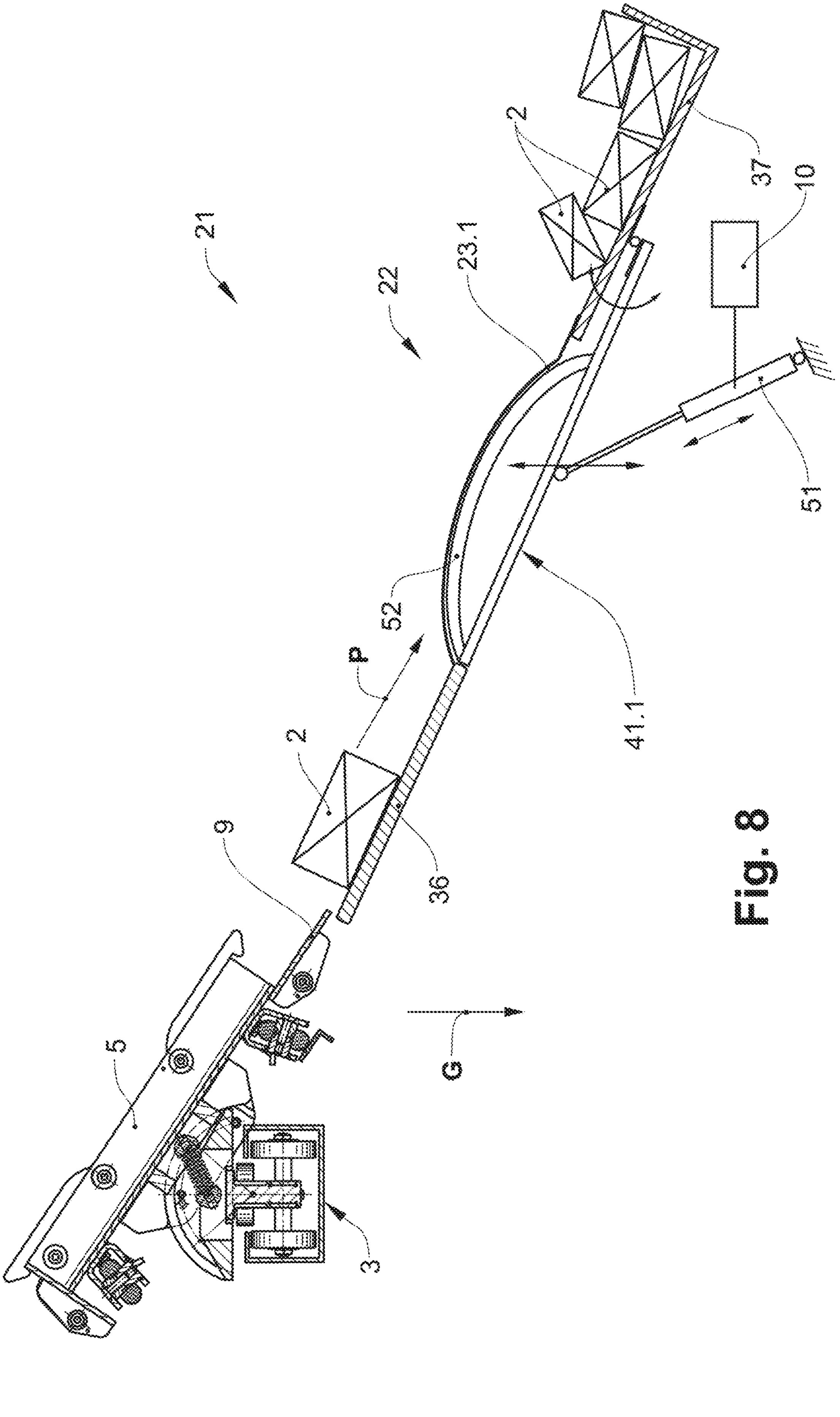
FIG. 8 a lateral view of a further embodiment of a take-over appliance.

FIG. 8 shows a modification of a lifting element 52. This towards the rest element 23.1 includes a convex prominence, so that the rest element 23.1 is arched upwards in the empty position of the lifting element 52. By way of this, a reliable emptying of the storage space V is ensured by way of the piece goods 2 which are lifted out of the receiving trough 24 sliding from the convex surface of the rest element 23.1 in the direction of the collecting device 37 in the empty position.

The convex prominence can moreover also exert a braking effect upon the piece goods 2 which slide away from the conveying tray 5 and which would otherwise slide through towards the collecting device 37 in a direct and non-braked manner as in the embodiment according to FIG. 2*b*.

According to the embodiment according to FIGS. 3 to 6, the size or depth T of the receiving trough 24 and thus the size of the storage space Vis controlled via the change of the length of the rest element 24 between the trough entry 25 and the trough exit 26. The shorter this length, the lower is also the depth T of the receiving trough 24 and therefore the receiving trough 24 and thus the storage space V are accordingly also smaller. In an empty position, the rest element 23.1 between the trough entry 25 and the trough exit 25 forms a plane resting surface or sliding surface and thus no longer forms a receiving trough 24.

The adjusting mechanism 4.1 includes a storage configuration 42 for the intermediate storage of a length section of the rest element 23.1 for the purpose of shortening the length of the rest element 24 between the trough entry 25 and the trough exit 26.

For this, the storage configuration 42 includes a storage means in the design of a winding-up and unwinding body 43. According to FIG. 3, an end section 27 of the rest element 23.1 which is arranged in front of the through entry 25 is connected to the winding-up and unwinding body 43. For this, the rest element 23.1 is deflected towards the winding-up and unwinding body 43 at the trough entry 25 via a defection roller 46. The winding-up and unwinding body 43 is driven via a drive 44.

Figure 6:
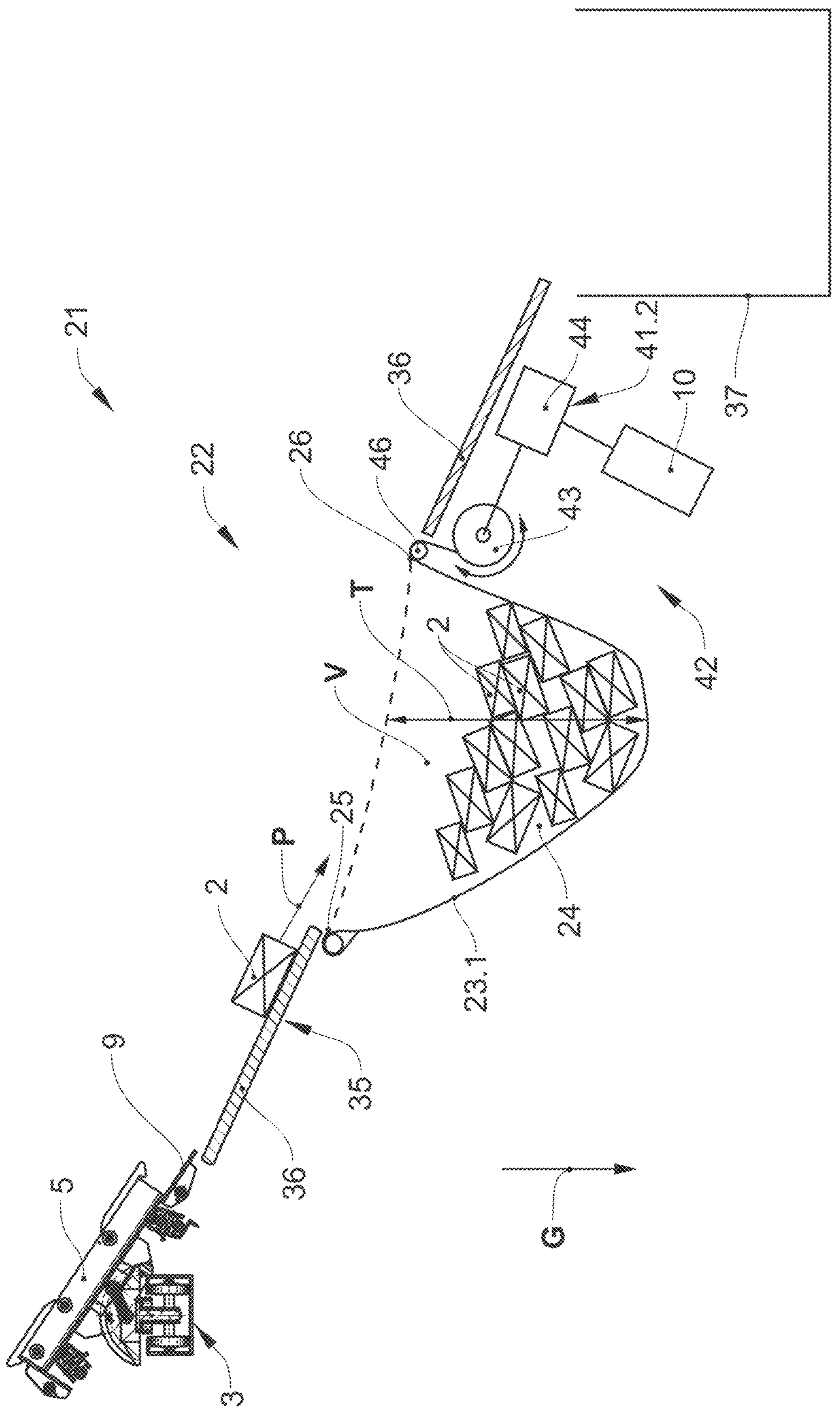
FIG. 6 a lateral view of a further embodiment of a take-over appliance.

According to FIG. 6, an end-section 27 of the rest element 23.1 which is arranged subsequently to the trough exit 26 is connected to the winding-up and unwinding body 43. For this, the rest element 23.1 at the trough exit 26 is deflected towards the winding-up and unwinding body 43 via a deflection roller 46. The functioning manner of the storage configuration according to FIG. 6 however corresponds to that according to FIG. 3.

Figure 4:
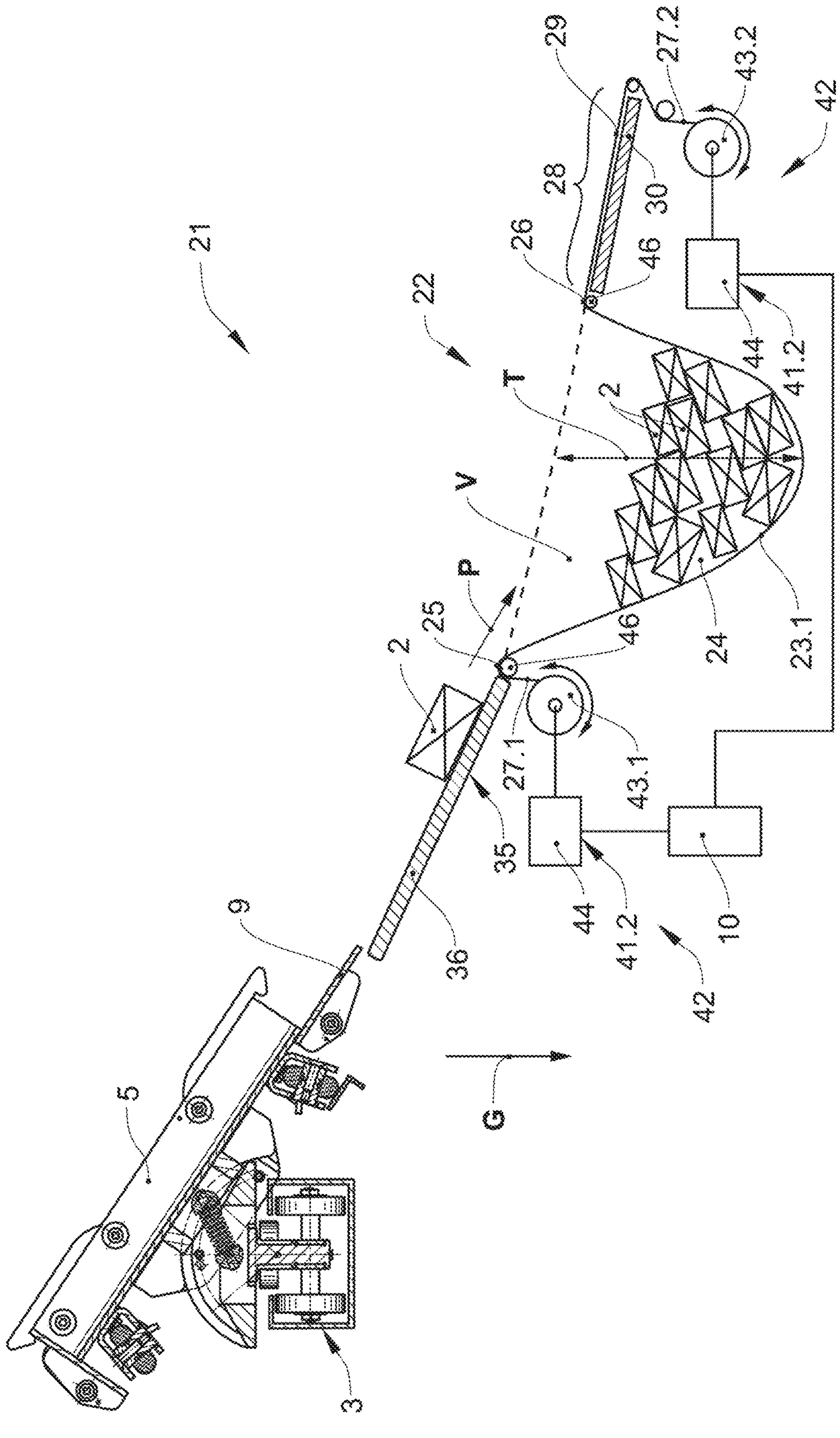
FIG. 4 a lateral view of a further embodiment of a take-over appliance.

According to FIGS. 4 and 5, an end section 27.1 of the rest element 23.1 which is arranged in front of the trough entry 25 as well as an end section 27.2 of the rest element 23.1 which is arranged after the trough exit 26 is connected in each case to a winding-up and unwinding body 43.1, 43.2. The application of two winding-up and unwinding bodies 43, 43.2 permits a more rapid shortening or lengthening of the length of the rest element 23.1 between the trough entry 25 and the trough exit 26. Moreover, the delivery of individual piece goods 2 out of the storage space V or out of the receiving trough 24 can be controlled to an improved extent by way of an individual drive of the two winding-up and unwinding bodies 43.1, 43.1. Apart from that, the manner of functioning of the storage configuration according to FIGS. 4 and 5 corresponds to that according to FIGS. 3 and 6.

Figure 7:
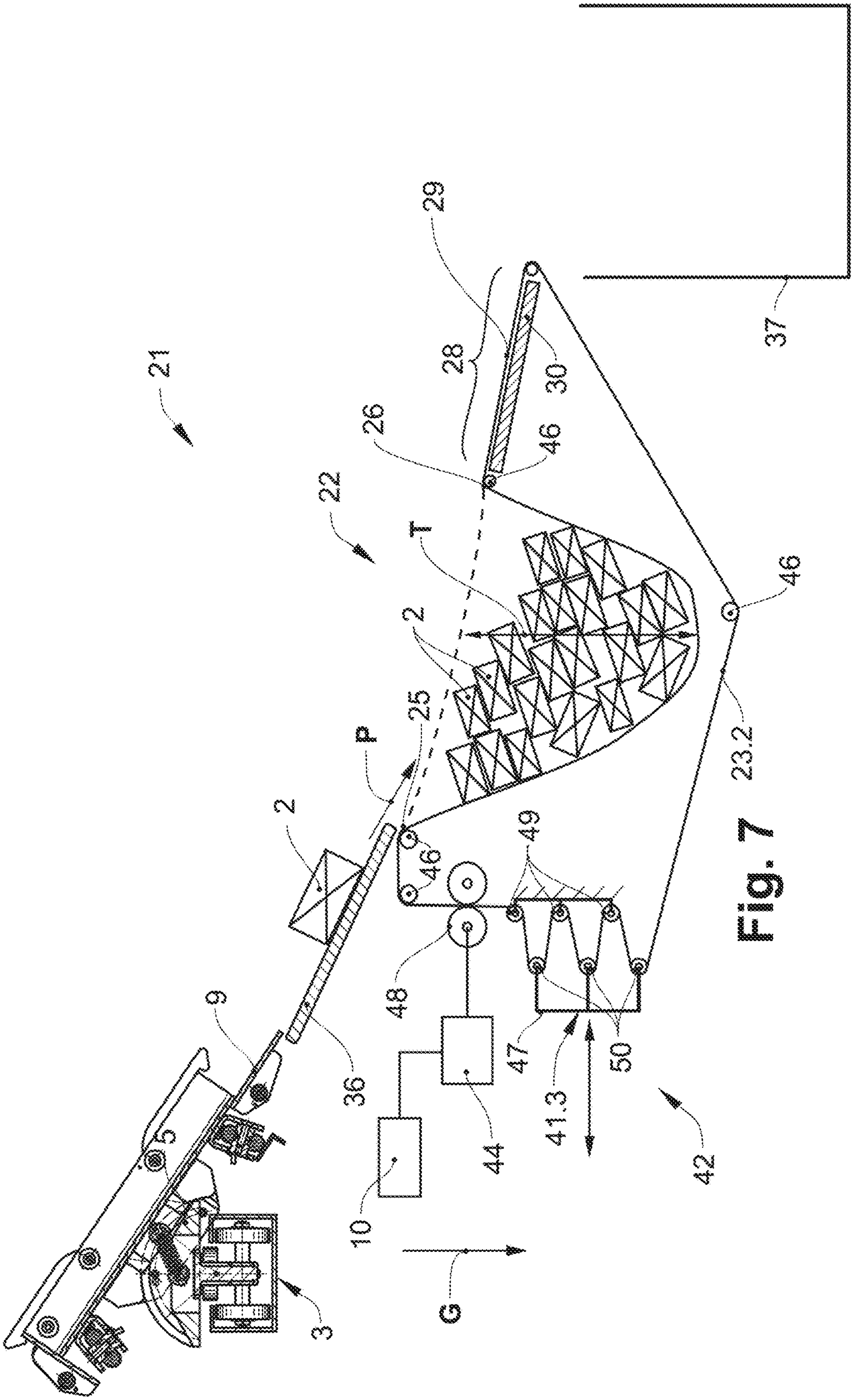
FIG. 7 a lateral view of a further embodiment of a take-over appliance.

The embodiment according to FIG. 5 shows yet a further significant aspect of the present invention, whose basic principle is also implemented in the embodiment according to FIG. 7.

The rest element 23.1, 23.2 therefore forms a rest section 28 which is subsequent to the trough exit 26 in the process direction P and which is with a rest surface 29 for the piece goods 2 which are released from the receiving trough 24. The rest surface 29 is designed in a plane manner and runs obliquely downwards in the process direction P. The rest section 28 is supported from below by an extensive support element 30, such as e.g. a support plate. Herewith, a sagging of the rest element 23.1, 23.2 in the case of a weight loading by piece goods 2 is prevented. In particular, this is of significance if the rest element 23.1, 23.2 is designed elastically in the manner described above.

The rest element 23.1, 23.2 at the trough exit 26 is deflected out of the receiving trough 24 into the rest section 28 via a deflection roller 28.

The adjusting mechanism 41.2, 41.3 with the storage configuration is then designed such that the length of the rest element 23.1, 23.2 between the trough entry 25 and the trough exit 26 can be shortened by way of the rest section 28 of the rest element 23.1, 23.2 being pulled forwards via the adjusting mechanism 41.2, 41.3, i.e. being moved in the process direction P.

This is effected according to FIG. 5 by way of an end section 27 of the rest element 23.1 which is arranged after the rest section 28 in the process direction P being arranged on the winding-up and unwinding body 43. A tensile force is exerted upon the rest section 28 in the process direction P due to the winding-up procedure, by which means the rest section 28 is pulled forwards amid the reduction in size of the receiving trough 24.

On account of the pulling-forward of the rest section 28 and the reduction in size of the storage space V which this entails, individual piece goods 2 are moved out of the receiving trough 24 via the trough exit 26 and on the rest section 28 which is co-moved by way of the pulling-forward, are moved in the process direction P, i.e. in the direction of the take-over region. The pulling-forward of the rest section 28 also effects a conveying-active movement of the piece goods 2 which lie on the rest section 28.

According to the embodiment according to FIG. 7, the rest element is designed in a continuous manner. Accordingly, the rest element amongst other thing is led around deflection rollers 46.

Here too, the rest section 28 is pulled forward by way of a suitable drive of the circulating rest element 23.2, so that the piece goods 2 which are released from the storage space V are co-moved on the rest section 28 in the process direction P as described above.

According to this embodiment, the storage means however is formed by a loop store 47. For this, the rest element 23.2 is led outside the length section which is arranged between the trough entry 25 and the trough exit 26 in a loop-like manner about deflection rollers 49, 50. The loop store 47 includes a first set of stationary deflection rollers 49 as well as a second set with displaceable deflection rollers 50 which are each arranged in an offset manner with respect to the stationary deflection rollers 49. By way of displacing the second set of deflection rollers 50 with respect to the first set of deflection rollers 49, the loops of the rest element 23.2 which is led around the deflection rollers 49, 40 can be enlarged or reduced in size. Accordingly, the length of the rest element 23.2 between the trough entry 25 and the trough exit 26 is shortened or reduced in size.

For changing its length between the trough entry 25 and the trough exit 26, the rest element 23.2 is driven via a drive arrangement 48. The drive arrangement 48 for this includes a pair of clamping rollers through which the two-dimensional rest element 23.2 is led with a friction fit. The clamping roller pair is driven by a drive 44. The drive arrangement 48 also serves for braking the rest element 23.2 or clamping the rest element 23.2 in an idle position or on enlarging the storage space V. The drive arrangement 48 is controlled via a control device 10.

The invention claimed is:

1. A take-over appliance for a sorting facility for taking over piece goods which at a delivery location are delivered from a sorting conveyor, comprising a buffer device which forms a storage space, for an intermediate storing or buffering of delivered piece goods, wherein a size of the storage space of the buffer device can be adjusted during operation of the sorting facility, wherein the buffer device comprises a flexible, two-dimensional rest element which, for the intermediate storing of piece goods, forms a receiving trough for the piece goods, said receiving trough delimiting the storage space to a bottom, and the buffer device comprises an adjusting mechanism for adjusting a depth of the receiving trough for adjusting the size of the storage space, wherein the adjusting mechanism is configured to change a length of the rest element between a trough entry and a trough exit of the receiving trough, wherein the adjusting mechanism comprises a storage configuration for storing a length section of the rest element, and wherein the storage configuration for dynamic intermediate storing of the length section of the rest element comprises one of the following storage devices:

a winding-up and unwinding body for winding up and unwinding the length section of the rest element;

a loop store;

dancer rollers.

2. The take-over appliance according to claim 1, wherein for reducing the depth of the receiving trough, the adjusting mechanism is configured to shorten the length of the rest element between the trough entry and the trough exit, wherein the adjusting mechanism is in a position of exerting a tensile force upon the rest element.

3. The take-over appliance according to claim 1, wherein the storage configuration for enlarging or decreasing the depth of the receiving trough comprises at least one winding-up and unwinding body for winding up and unwinding the length section of the rest element, said rest element being fastened with an end section to the winding-up and unwinding body.

4. The take-over appliance according to claim 1, wherein the rest element is continuous and is led around deflection elements.

5. The take-over appliance according to claim 1, wherein the receiving trough is formed between the trough entry and the trough exit and wherein the trough exit, with respect to a direction of gravity, is below the trough entry.

6. The take-over appliance according to claim 1 further comprising a feed device which, in a process direction, is arranged in front of the buffer device, said feed device comprising a conveying slide via which the piece goods at the delivery location can be fed to the buffer device with assistance of gravity.

7. A sorting facility with a sorting conveyor and with at least one delivery location, and with the take-over appliance according to claim 1, said take-over appliance being arranged at the at least one delivery location.

8. The sorting facility according to claim 7, further comprising a plurality of delivery locations which are arranged along a conveying track of the sorting conveyor, and at which, in each case, a take-over appliance is each arranged, said take-over appliance comprising a buffer device which forms a storage space, for an intermediate storing or buffering of delivered piece goods, wherein a size of the storage space of the buffer device can be adjusted during operation of the sorting facility, wherein the buffer device comprises a flexible, two-dimensional rest element which, for the intermediate storing of piece goods, forms a receiving trough for the piece goods, said receiving trough delimiting the storage space to a bottom, and the buffer device comprises an adjusting mechanism for adjusting a depth of the receiving trough for adjusting the size of the storage space.

9. The sorting facility according to claim 7, wherein the receiving trough of the buffer device is directly laterally adjacent to the sorting conveyor, whereby the piece goods which are delivered from the sorting conveyor fall directly onto the rest element or into the receiving trough of the buffer device with assistance of gravity.

10. A method for taking over piece goods by way of the take-over appliance according to claim 1, said piece goods being delivered at a delivery location of a sorting facility by way of a sorting conveyor, comprising the steps of:

delivering a piece good at the delivery location;

taking over the delivered piece good by the take-over appliance;

wherein the piece good moves into the receiving trough of the buffer device and is intermediately stored in the receiving trough.

11. The method according to claim 10, wherein for the intermediate storage of several piece goods, the depth of the receiving trough and the storage space is enlarged by the adjusting mechanism and for the further conveying of at least one piece good, the depth of the receiving trough and the storage space is reduced in size by the adjusting mechanism and the piece good is consequently moved out of the receiving trough in a process direction.

12. The take-over appliance according to claim 2, wherein the adjusting mechanism exerts tensile force upon an end section of the rest element.

13. A take-over appliance for a sorting facility for taking over piece goods which at a delivery location are delivered from a sorting conveyor, comprising a buffer device which forms a storage space, for an intermediate storing or buffering of delivered piece goods, wherein a size of the storage space of the buffer device can be adjusted during operation of the sorting facility, wherein the buffer device comprises a flexible, two-dimensional rest element which, for the intermediate storing of piece goods, forms a receiving trough for the piece goods, said receiving trough delimiting the storage space to a bottom, and the buffer device comprises an adjusting mechanism for adjusting a depth of the receiving trough for adjusting the size of the storage space, wherein the receiving trough is formed between a trough entry and a trough exit, and a rest section of the rest element which, in a process direction is subsequent to the trough exit, forms a rest surface for the piece goods which are released from the receiving trough, and a length of the rest element between the trough entry and the trough exit can be shortened by the rest section being pulled forward in the process direction by the adjusting mechanism.

14. The take-over appliance according to claim 13, wherein the rest surface of the rest section is planar.

15. The take-over appliance according to claim 13, wherein by pulling forward the rest section to reduce the size of the storage space, individual piece goods can be moved via the trough exit out of the receiving trough and on the rest section in the process direction.

16. The take-over appliance according to claim 13, wherein a support element for supporting the rest section of the rest element to the bottom is arranged below the rest section of the rest element.

17. The take-over appliance according to claim 13, wherein the trough exit, with respect to a direction of gravity, is below the trough entry.

18. The take-over appliance according to claim 13, wherein the rest surface of the rest section is inclined or horizontal.

19. A method for taking over piece goods by way of the take-over appliance according to claim 13, said piece goods being delivered at a delivery location of a sorting facility by way of a sorting conveyor, comprising the steps of:

delivering a piece good at the delivery location;

taking over the delivered piece good by the take-over appliance;

wherein the piece good moves into the receiving trough of the buffer device and is intermediately stored in the receiving trough.

20. The method according to claim 19, wherein the rest section of the rest element is pulled forward to reduce the depth of the receiving trough and the size of the storage space and the piece good is consequently moved out of the receiving trough via the trough exit and on the pulled-forward rest section in the process direction.

* * * * *